United States Patent [19]
Itoh et al.

[11] Patent Number: 5,373,437
[45] Date of Patent: Dec. 13, 1994

[54] DEVICE FOR AND METHOD OF REDUCING CROSS TALK IN OPTICAL DISK DEVICE

[75] Inventors: Tsuyoshi Itoh; Isao Okuda; Hiroshi Nishikawa; Toshiyuki Kase; Ryota Ogawa; Masahiro Oono; Koichi Maruyama; Makoto Iki, all of Tokyo, Japan

[73] Assignee: Asahi Kogaku Kogyo Kabushiki Kaisha, Tokyo, Japan

[21] Appl. No.: 740,726

[22] Filed: Aug. 6, 1991

[30] Foreign Application Priority Data

Aug. 7, 1990 [JP] Japan .................. 2-208630

[51] Int. Cl.⁵ .................................. G11B 7/00
[52] U.S. Cl. .................. 364/44.32; 369/44.35; 369/44.23; 250/201.5
[58] Field of Search .............. 369/44.23, 44.24, 124, 369/110, 112, 44.25, 44.26, 44.41, 44.42, 44.14, 44.11, 44.34, 116, 44.32, 54, 44.29, 44.35, 44.36, 44.32; 250/201.5

[56] References Cited

U.S. PATENT DOCUMENTS

| | | | |
|---|---|---|---|
| 4,890,274 | 12/1989 | Kaneko et al. | 369/44.35 |
| 4,941,138 | 7/1990 | Chida et al. | 369/44.11 |
| 5,001,695 | 3/1991 | Tominaga | 369/44.35 |
| 5,070,494 | 12/1991 | Emoto et al. | 369/44.23 |
| 5,084,850 | 1/1992 | Yanagawa | 369/124 |
| 5,095,477 | 3/1992 | Shimozawa | 369/112 |
| 5,099,468 | 3/1992 | Suzuki et al. | 369/44.23 X |

FOREIGN PATENT DOCUMENTS 0206024 8/1990 Japan .................. 369/44.23

OTHER PUBLICATIONS

Isailovic Jordan, "Videodisc and Optical Memory System," 1985, pp. 113–119.
Pohlmann, Ken C. "Principles of Digital Audio", 1985 pp. 241–244.

Primary Examiner—W. R. Young
Assistant Examiner—Thang V. Tran
Attorney, Agent, or Firm—Sandler, Greenblum & Berstein

[57] ABSTRACT

A device in which an offset is added to a focusing error signal to control an objective lens and thereby reduce the generation of cross-talk when a beam spot that is converged on an optical disk crosses over a wall of a groove of a track of the disk. By adding the offset to the focusing error signal, the objective lens is moved out of focus with the disk. Thus, the shape of a beam spot formed on a photo sensor is changed from a circle to an ellipse. A condenser lens provided for forming the beam spot is moved along the optical axis thereof in such a manner that an output of a recorded signal of the disk is at a maximum value. As a result, the objective lens is brought into focus on the disk. Thereafter, the objective lens is focused on the disk in accordance with the focusing error signal to which the offset is added, while maintaining the beam spot in the shape of an ellipse.

17 Claims, 5 Drawing Sheets

DEVICE FOR AND METHOD OF REDUCING CROSS TALK IN OPTICAL DISK DEVICE

BACKGROUND OF THE INVENTION

1. Field of the Invention

The present invention relates to a device for reducing cross-talk in an optical disk device, in which an astigmatism method is used for sensing focusing errors.

2. Description of the Related Art

An optical disk device is constructed such that a luminuos flux outputted from a laser source is focused and formed as a spot on an optical disk that is used as a recording medium, whereby a reproduction and recording of a signal is carried out. In this case, to carry out an accurate recording and reproduction of the signal, it is necessary to converge a laser beam on an optical disk as a spot having a diameter which approximates a diffracting limit of the beam, so that the laser beam exactly traces data on a recording track of the optical disk. Accordingly, the optical disk device is provided with an error sensing system for sensing focusing errors and tracking errors, and a drive mechanism for driving the laser beam spot along the optical axis of the optical system and in the radial direction of the optical disk.

Among the known methods of sensing focusing errors, the astigmatism method is most generally used. In the astigmatism method, a beam reflected from an optical disk is converged on a photo sensor by using an element, such as a cylindrical lens, having an astigmatic difference, so that a defocusing of the spot converged on the optical disk is determined as a change of a sectional shape of the luminous flux on the photo sensor.

The photo sensor that is is provided with a square-shaped sensor divided into four photo receiving areas by lines which are perpendicular to each other, and pass through and cross each other at the center of the square-shaped sensor. The focusing error signal is obtained by calculating a difference of each of the sums of signals outputted from the photo receiving areas located diagonally on the surface of the square-shaped sensor, i.e., at opposite left and right upper and lower corners thereof, respectively.

In the optical disk, device using an optical disk such as a photo magnetic disk, a beam spot is traversed across one track, to thereby access another track at which recording or reproduction is to be carried out. When a sensing of focusing errors is carried out in accordance with the astigmatism method, however, if a luminous flux converged on the optical disk is affected by a wave aberration, due to a characteristic of the optical system, noise is added to the focusing error signal when the spot is moved across a track.

The noise is caused by an uneven intensity of the light of the beam spot on the photo sensor, due to a diffraction of the light occurring when a spot having a wave aberration traverses a wall of a groove forming a boundary between adjacent tracks. In this specification, this noise is defined as focus-track cross-talk (or F-T-cross-talk) hereinafter.

When focus-track cross-talk occurs, a focusing error signal is generated which appears to denote that the objective lens has deviated from an in-focus position. Accordingly, the objective lens is moved in the optical axis direction. Therefore, the objective lens is in an unstable state every time the spot traverses a track, and this leads to errors in the movement of the spot.

SUMMARY OF THE INVENTION

Therefore, an object of the present invention is to provide a device and a method by which F-T cross-talk generated when the spot traverses a track is restricted or reduced.

According to the present invention, there is provided a device for reducing cross-talk generated in an optical disk device, the device comprising an astigmatism imparting mechanism, a receiving mechanism, a control mechanism, a sensing mechanism, a setting mechanism and an adjusting mechanism. The astigmatism imparting mechanism imparts an astigmatism to a luminous flux lead from an optical disk, and converges the luminous flux. The receiving mechanism receives the luminous flux and outputs a focusing error signal in accordance with a state of the luminous flux. The control mechanism controls an objective lens in accordance with the focusing error signal so that a beam spot is converged on the optical disk. The sensing mechanism senses a focusing state in which the beam spot is converged on the optical disk, and is provided separately from the control mechanism. The setting mechanism sets a predetermined offset to the focusing error signal. The adjusting mechanism adjusts the astigmatism imparting mechanism in accordance with the focusing state under a condition in which the offset is set to the focusing error signal, whereby the objective lens is adjusted so that the beam spot is converged on the optical disk.

Further, according to the present invention, there is provide a device for reducing cross-talk generated in an optical disk device, the device comprising an optical system, a receiving mechanism, a generating mechanism, a control mechanism, a sensing mechanism, a setting mechanism and an adjusting mechanism. The optical system imparts an astigmatism to a luminous flux lead from an optical disk through an objective lens, and converges the luminuos flux. The receiving mechanism receives the luminous flux from the optical system. The generating mechanism generates a focusing error signal in accordance with the shape of a beam spot of the luminous flux on the receiving mechanism. The control mechanism controls the objective lens in accordance with the focusing error signal so as to maintain the shape of the beam spot as a predetermined shape. The sensing mechanism senses an intensity of the luminous flux from the optical disk. The setting mechanism sets the predetermined shape by adding a predetermined offset to the focusing error signal generating mechanism, whereby the focusing error signal that generating mechanism outputs a focusing error signal includes the predetermined offset. The adjusting mechanism adjusts the position of the objective lens, and is operated in accordance with an output of the intensity sensing mechanism.

Furthermore, according to the present invention, there is provided a device for reducing cross-talk generated in an optical disk device, the device comprising an optical system, a focusing control system, a sensing mechanism and a setting mechanism. The optical system imparts an astigmatism to a luminous flux lead from an optical disk, and converges the luminous flux. The focusing control system receives the luminous flux and outputs a focusing error signal in accordance with an astigmatism method. The focusing control system controls a focusing of a beam spot on the optical disk in accordance with the focusing error signal. The sensing mechanism senses a focused state of an objective lens on the optical disk, and is provided separately from the focusing control system. The setting mechanism sets an offset level to the focusing error signal. After the setting mechanism has set the offset level, the optical system is adjusted in accordance with an output of the sensing mechanism so that the beam spot is converged on the optical disk.

Still further, according to the present invention, there is provided a device for reducing cross-talk generated in an optical disk device, the device comprising an astigmatism generating element, a photo sensor and a control mechanism. The astigmatism generating element imparts an astigmatism to a luminous flux lead from an optical disk. The photo sensor receives the luminous flux and outputs a focusing error signal in accordance with the luminous flux. The control mechanism controls an objective lens in accordance with the focusing error signal so that a beam spot is converged on the optical disk based on the focusing error signal. The astigmatism generating element and the photo sensor is able to rotate about the optical axis relative to each other.

Further, according to the present invention, there is provided a device for an optical disk having means for generating a focusing error signal obtained by an astigmatism method, the improvement comprising a setting mechanism, a sensing mechanism and an adjusting mechanism. The setting mechanism sets a predetermined offset to the focusing error signal, whereby the focusing error signal includes the predetermined offset. The sensing mechanism senses an intensity of a luminous flux from the optical disk. The adjusting mechanism adjust a position at which a luminous flux is converged on the optical disk by the objection lens, and is operated in accordance with the outputs of the intensity sensing mechanism so that a divergence of the converging position caused by setting the predetermined offset is cancelled.

Furthermore, according to the present invention, there is provided a device for a method of reducing cross-talk generated in an optical disk device, the method comprising a first step of imparting an astigmatism to a luminous flux lead from an optical disk, and converging the luminous flux, a second step of receiving the luminous flux, and outputting a focusing error signal in accordance with the luminous flux, a third step of controlling an objective lens in accordance with the focusing error signal so that a beam spot is converged on the optical disk, a fourth step of setting a predetermined offset to the focusing error signal, and a fifth step of adjusting the objective lens in accordance with an output signal of a focusing sensing mechanism in a state in which the offset is set to the focusing error signal, so that the beam spot is converged on the optical disk, the focusing sensing mechanism outputting a signal denoting a focused state of the objective lens.

BRIEF DESCRIPTION OF THE DRAWINGS

The present invention will be better understood from the description of the preferred embodiments of the invention set forth below, together with the accompanying drawings, in which.

Figure 1:
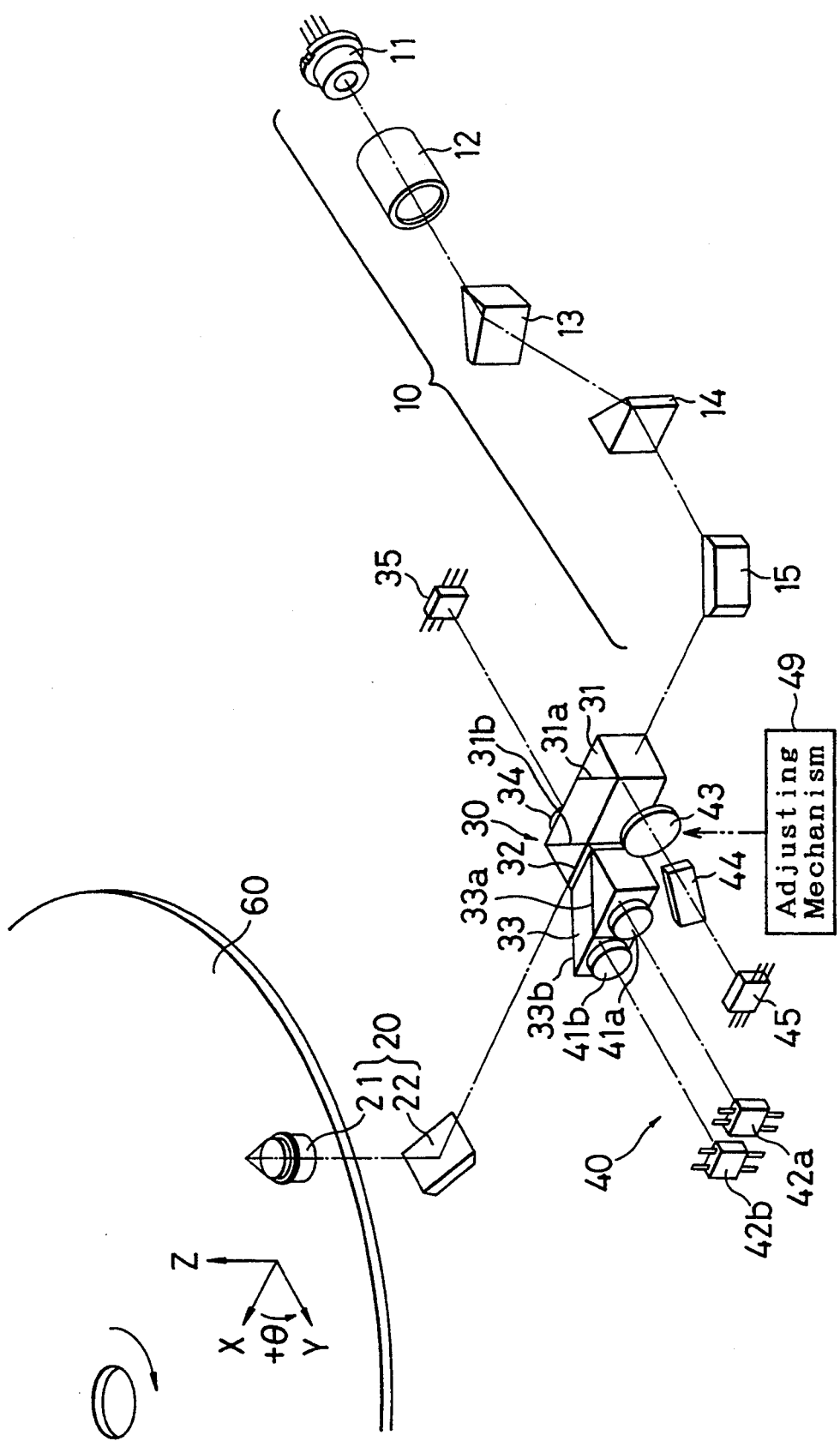
FIG. 1 is a perspective view showing a disposition of optical elements provided in an optical disk device of an embodiment of the present invention.

DESCRIPTION OF THE PREFERRED EMBODIMENTS the present invention will not be described with reference to embodiments shown in the drawings.

FIG. 1 shows an embodiment in which the present invention is applied to an information recording and reproducing device using a magneto-optic disk.

An optical system, shown in FIG. 1, includes a light source 10, an objective optical system 20, a prism block 30, and a signal sensing optical system 40. The objective optical system 20 is provided in an optical head knot shown) and is movable in a radial direction "x" of a magneto-optic disk 60. The optical source 10, prism block 30 and signal sensing optical system 40 are fixed to the rotational center of the magneto-optic disk 60. The light source 10 includes a semiconductor laser 11, a collimator lens 12, two anamorphic prisms 13, 14, and a galvano-mirror 15.

In this optical system, diverging beams generated by the semiconductor laser 11 are changed into a parallel luminous flux by the collimator lens 12. A sectional shape of the luminous flux is formed by the anamorphic prisms 13, 14, such that parallel beams having a circular section are outputted. The galvano-mirror 15 is provided for moving a beam spot formed on the magneto-optic disk 60 tangentially thereto.

The objective optical system 20 includes an objective lens 21 and a mirror 22; the objective lens 21 converges a beam on a recording surface of the magneto-optic disk 60. The objective lens 21 and the mirror 22 are provided in the optical head (not shown). The objective lens 21, which is mounted on an actuator disposed in the optical head, is precisely driven in a direction of the optical axis "Z" thereof in accordance with a focusing error signal, to be described later.

The prism block 30 comprises by a first block 31 and a second block 32. The first block 31 has a first half-mirror surface 31a and a second half-mirror surface 31b. The second block 32 is fixed to the first block 31 through a λ/2-plate 33 that has a polarized light splitting surface 33a and a total reflecting surface 33b.

Accordingly, a part of the luminous flux outputted from the light source 10 is reflected by the second half-mirror surface 31b and is converged by a condenser lens 34 onto a photo sensor 35 that is provided for automatically adjusting an output of the semiconductor laser 11.

Further, the luminous flux reflected by the optical disk 60 is reflected by the second half-mirror 31b, and the polarizing direction of the luminous flux is rotated by 45 degrees by the λ/2-plate 32. The P-polarized-component of the luminous flux is transmitted through the polarized light splitting surface 33a, and is converged by a condenser lens 41a on a first photo sensor 42a that is provided for sensing a magnetic recorded signal of the optical disk 60. An S-polarized-component of the luminous flux is reflected by the polarized light splitting surface 33a and the total reflecting surface 33b, and converged through a condenser lens 41b on a second photo sensor 42b that is also provided for sensing a magnetic recorded signal of the optical disk 60.

A plane of polarization of the laser beam entering the magneto-optic disk 60 is rotated, or rotationally displaced, due to the Kerr electrostatic effect, in accordance with a magnetization of a portion of the disk 60 on which the beam spot is formed. Therefore, by rotating the laser beam by 45 degrees, to thus separate the beam into a P-component and an S-component, and then sensing these components by the separate photo sensors 42a and 42b, respectively, a signal recorded on the disk 60 can be read in accordance with a difference between the intensities of the light sensed by sensors 42a and 42b.

In the beam reflected by the disk 60, a component transmitted through the second half-mirror 31b is reflected by the first half-mirror 31a, and subjected to an astigmatic difference by a cylindrical lens 44, through a condenser lens 43, and converged on an error sensing photo sensor 45. It is noted that the condenser lens 43 is moved along the optical axis thereof by an adjusting mechanism 49.

Figure 2:
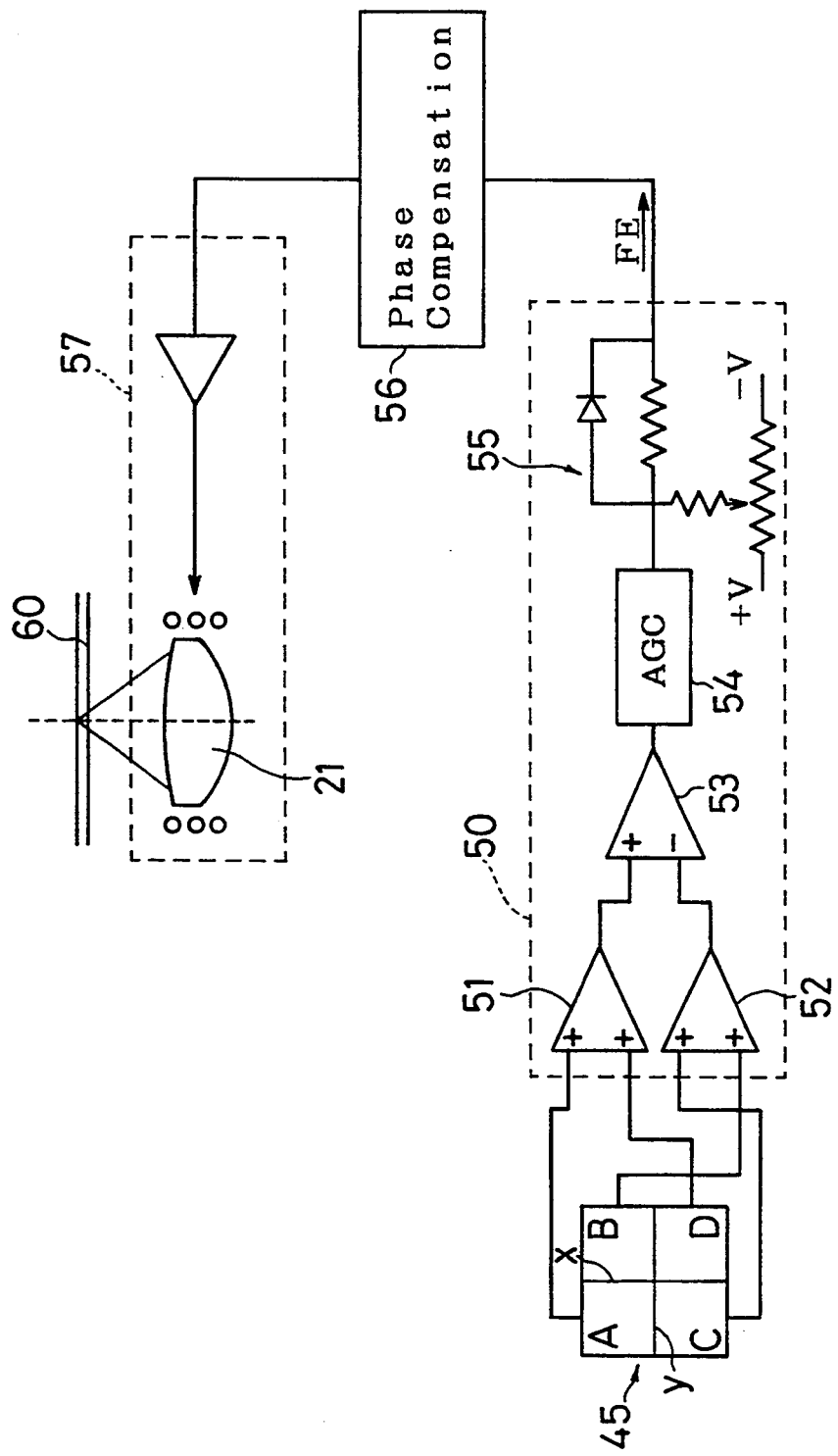
FIG. 2 is a block diagram showing beam receiving areas of an error sensing photo sensor and a circuit for sensing a focusing error.

The beam receiving areas of the error sensing photo sensor 45 are disposed as shown in FIG. 2. Beam receiving areas A, B, C and D are defined by dividing the sensing area into four portions by a first axis extending in a direction "x" corresponding to a radial direction of the disk 60, and a second axis extending in a direction "y" corresponding to a tangential direction of the disk 60.

A focusing error sensing circuit 50 includes adders 51 and 52, a subtracter 53, an automatic gain control (AGC) circuit 54, and an offset adjusting circuit 55. The adder 51 obtains the sum of output signals from the beam receiving areas A and D of the photo sensor 45, which are located diagonally from each other on the face of the photo sensor 45. The adder 52 obtains the sum of output signals from the beam receiving areas B and C, in the same way as the adder 51. The subtracter 53 obtains a difference between outputs of the adders 51 and 52. The AGC circuit 54 adjusts an output of the subtracter 53, and the offset adjusting circuit 55 adds an offset to an output of the AGC circuit 54.

The four signals outputted from the photo sensor 45 are calculated in accordance with the following equation, wherein the offset is $\delta$, so that a focusing error signal FE is outputted:

$$FE=(A+D)-(B+C)+\delta$$

The offset is provided for carrying out an adjustment when a correct focusing error signal is not outputted, due to an error in a positional relationship among the cylindrical lens 44 and the photo sensor 45, etc., and for reducing F-T cross-talk as described later.

The focusing error signal FE outputted by the focusing error sensing circuit 50 is phase compensated by a phase compensating circuit 56, and then supplied to an actuator 57 which drives the objective lens 21 in accordance with the signal supplied from the phase compensating circuit 56, to correct a defocused state of the beam spot.

Further a track error signal TE is obtained by calculating the signals outputted by each of the beam receiving areas A, B, C and D, in accordance with the following equation:

$$TE=(A+B)-(C+D)$$

When the beam spot traces a track of the disk 60 while in an in-focus state, the spot formed on the photo sensor 45 is a circle, and does not contain any deviation of a distribution of the intensity of the light of the spot. Therefore, the focusing error signal FE and the track error signal TE are zero. When the beam spot is not in-focus, due, for example to a warping of the disk 60, the spot on the photo sensor 45 becomes an ellipse. As a result, the sum of the signals outputted from the beam receiving areas A and D is different from the sum of the signals outputted from the beam receiving areas B and C. Therefore, an error occurs in the focusing signal.

Figure 3:
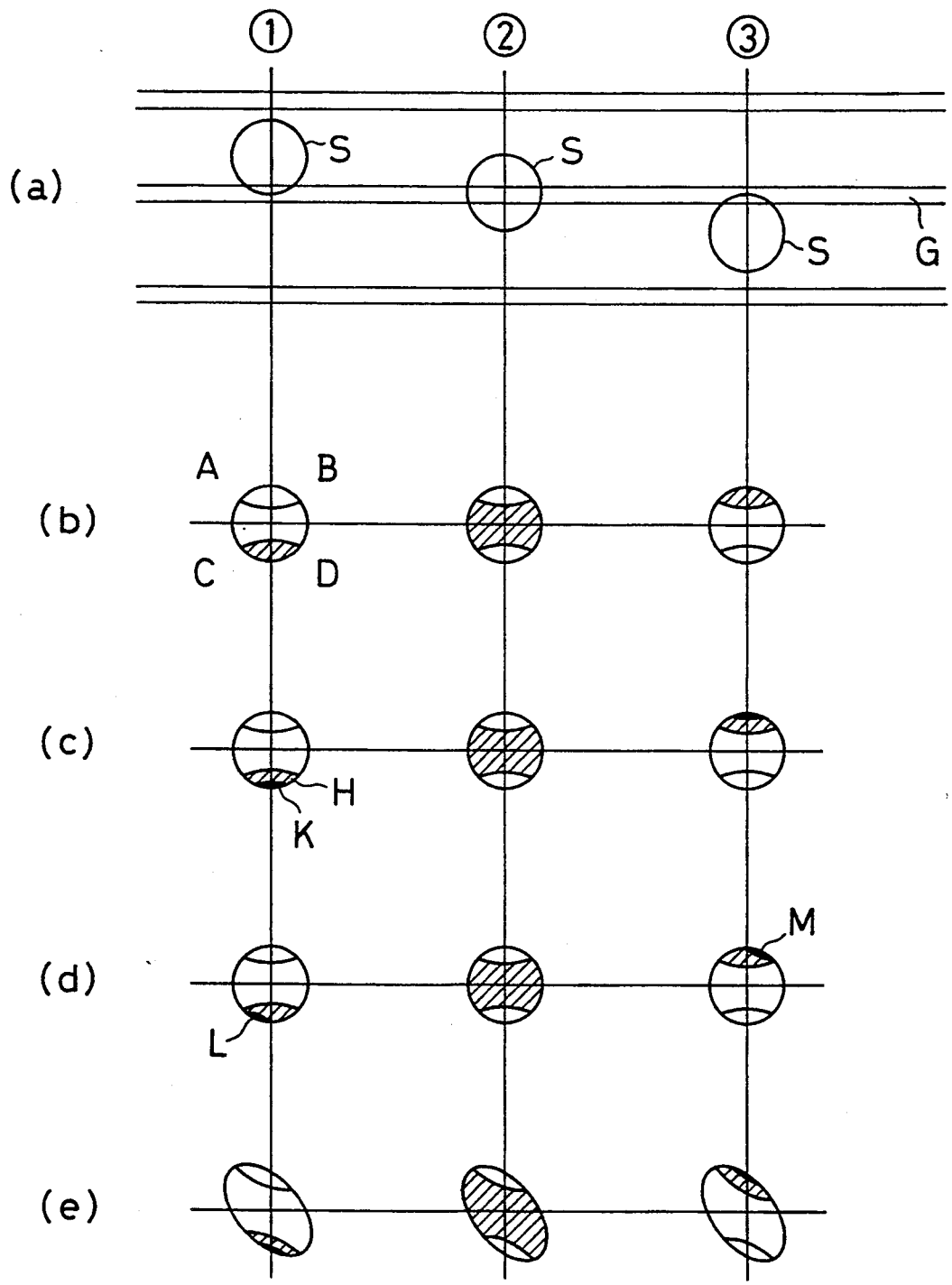
FIGS. 3(a)-3(e) are a schematic view showing a spot formed on an optical disk and a spot formed on a photo sensor.

FIG. 3 shows a relationship between a distribution of an amount of light on the error sensing photo sensor 45 and a signal sensed by the photo sensor 45, as described below.

In a state shown by 3(a), when beam spot S formed on the disk 60 traverses a track, and a part of the beam spot S overlaps a groove G forming the track, a deviation occurs in a distribution of intensity of the light of the spot formed on the photo sensor 45, due to a diffraction by the groove G, as shown by 3(b) ①. Namely, in an under portion, shown by a hatching in the drawing, the intensity of the light of the spot is high, and an certain amount of this light is deviated to the beam receiving areas C and D. Therefore, the track error signal TE is generated.

When the beam spot S formed on the disk 60 is located at the center of the groove G, as shown by 3(a) ②, the light of the spot on the photo sensor 45 is uniformly distributed over the beam receiving areas A, B, C and D, as shown by 3(b) ②, and thus, the track error signal becomes zero.

Then, when the beam spot on the disk 60 has passed over the groove G of the disk 60 as shown by 3(a) ③, a potion of the photo sensor 45, in which the intensity is large, is moved to the opposite side, i.e., the upper portion as shown by 3(b) ③. As a result, the track error signal TE has the opposite polarity to that shown by 3(b) ①.

As described above, when the beam spot S is moved from one track to another, a one cycle change in the track error signal TE occurs. By counting the change cycles, the number of tracks over which the beam spot S has crossed can be counted.

The above description is an ideal case, in which there is no wave aberration. The case in which a wave aberration exists is described below.

Assuming that a radial direction of the disk 60 is an x-axis, and a tangential direction of the track of the disk 60 is a y-axis vertical to the x-axis, taking the astigmatism as an example, the wave aberration existing in an optical system of an optical disk device can be denoted by a difference of curvatures of waves on the vertical axes, i.e., the x-axis and the y-axis (0 degree an d90 degrees), and by a difference of curvatures of waves on the vertical axes obtained when the x-axis and the y-axis are rotated by 45 degrees. In this specification, the waver aberration about the vertical axes of 0 degree and 90 degrees is defined as AS1, and the wave aberration about the vertical axes of ±45 degrees is defined as AS2.

When a luminous flux includes the wave aberration AS1, a distribution of the amount of light of the beam spot on the photo sensor 45 is changed, as shown by FIG. 3(c) in. If the wave aberration AS1 exists, when the beam spot on the disk 60 overlaps groove G of the track, in addition to an unbalanced amount of light, as shown by a hatch H, an abnormal distribution of the intensity of the light, as shown by a black point K occurs, due to a diffraction of the light by the groove G. Since this abnormal distribution K is extended over the beam receiving areas C and D, which are adjacent to each other on the face of the photo sensor 45, the signals of the beam receiving areas C and D are cancelled. Therefore, no cross-talk exists in the focusing error signal FE. Where the anamorphic optical system 13 and 14 are provided for correcting the shape of the luminous flux radiated from the semiconductor laser 11, as shown in FIG. 1, the wave aberration AS1 can be corrected by adjusting the distance between the semiconductor laser 11 and the collimator lens 12.

When the luminous flux includes the waver aberration AS2, an abnormal distribution of the intensity of the light of the beam spot, as shown by black points L and M in FIGS. 3(d) 1 and 3(d) 3, is generated. Due to such an abnormal distribution of the intensity of the light, the focusing error signal FE is not at the zero level when the beam spot crosses over a track, and thus F-T cross-talk exists in the focusing error signal FE. The wave aberration AS2 can not be corrected by adjusting the anamorphic optical system 13 and 14, and remains as an aberration.

Generally, in an optical disk device, if the amount of wave aberration is less than or equal to 0.045 λrms, the optical disk device provides a satisfactory performance. This waver aberration has a value obtained by summing up a spherical aberration, a comatic aberration and an astigmatism.

An astigmatism of less than or equal to 0.15 λp-v satisfies a characteristic of the optical disk device. Note, as far as the F-T cross-talk is concerned, a normal operation of the optical disk device is not possible unless the astigmatism in the ±45 degrees directions is less than or equal to 0.03 λp-v.

In the optical disk device of this embodiment, when the F-T cross-talk due to the AS2 is generated, the cross-talk is removed by adding an offset to the focusing error signal, whereby the focusing error signal is stabilized, as described later.

The way in which the offset is added to the focusing error signal is described below.

A track of the optical disk 60 is formed in a spiral shape so that the beam spot is moved from an inside portion of the disk 60 to an outside portion of the disk 60 by a rotation of the disk 60 an adjustment for reducing the F-T cross-talk is carried out in such a manner that a beam spot is converged on a track of the magneto-optic disk 60, and the beam spot is jumped to the adjacent inside track at every one revolution of the disk 60, whereby the beam spot repeatedly traces the same track. The F-T cross-talk occurs in the focusing error signal FE when the beam spot jumps from track to track.

First, the track error signal TE is sensed. During this sensing, the photo sensor 45 is adjusted along the x-axis direction (see FIG. 2) so that absolute values of peaks of the track error signal TE upon a track jump (when the beam spot jumps from one to another) become equal to each other.

Then, while sensing the focusing error signal, the photo sensor 45 is adjusted along the y-axis direction (see FIG. 2) so that an amplitude of the F-T cross-talk upon a track jump is minimized.

Figure 4:
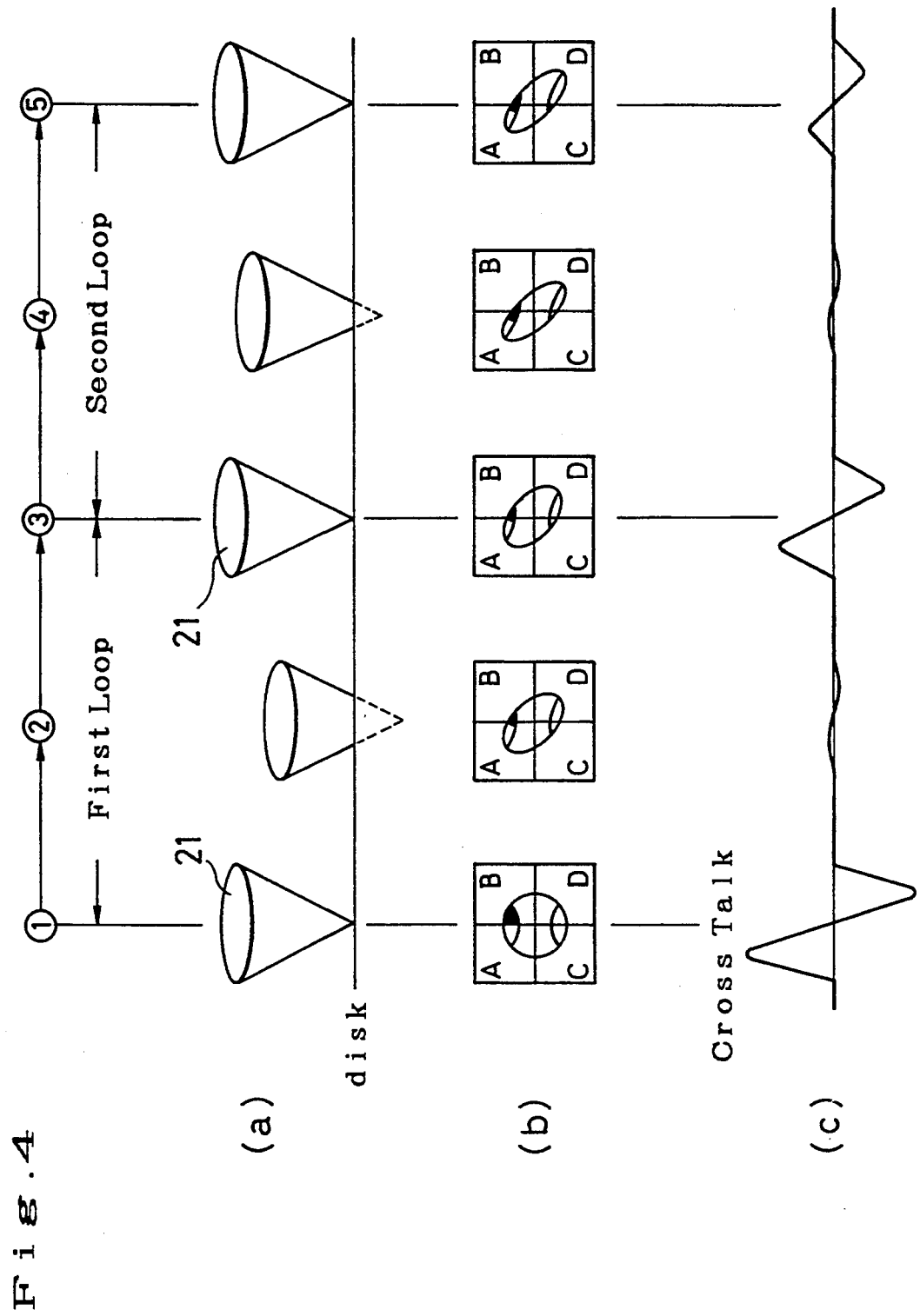
FIGS. 4(a)-4(c) are a schematic view showing each step in which an offset is added to a focusing error signal, to reduce cross-talk.

When the F-T cross-talk is not fully corrected by the adjustment described above, an adjustment made by adding an offset, as shown in FIG. 4, is carried out. In FIG. 4, each of the steps ① through ⑤ show the process of the adjustment; wherein FIG. 4(a) shows a relationship between the disk 60 and the objective lens 21, FIG. 4(b) shows a shape of the spot formed on the photo sensor 45, and FIG. 4(c) shows the focusing error signal generated when the beam spot crosses over a track of the disk 60 (i.e., cross-talk).

When the offset is added, since a basis of the focusing error signal is changed, the focusing error signal can no longer be used for determining whether the objective lens 21 is positioned at an in-focus position. Therefore, in the offset adjustment, the photo sensors 42a and 42b provided separately from the focus control mechanism for controlling the objective lens 21 so that it is in-focus, to thereby reproduce a magnetic signal recorded on the disk 60, are used for sensing a state in which the objective lens 21 is focused on the disk 60. Namely, a point at which a magnetic recorded signal IVFO, which is an output of the photo sensors 42a and 42b, is at a maximum value is determined to be an in-focus position.

As described above, a focusing servo control is carried out in such a manner that the objective lens 21 is moved, so that outputs A, B, C and D of each of the beam receiving areas of the photo sensor 45 satisfy the following equation:

$$(A+D)-(B+C)=0$$

When the offset is not added, as shown in FIG. 4(a) ① the objective lens 21 is in-focus on the disk 60. Thus, the spot of the photo sensor 45 is a circle, as shown by FIG. 4(b) ①. Since an abnormal distribution of the intensity of the light of the beam spot occurs due to an effect of the wave aberration AS2, as shown by a black portion, a large amount of F-T cross-talk is generated, as shown in FIG. 4(c)①.

Then, when a volume of the offset adjusting circuit 55 is adjusted, so that the offset δ is added, the objective lens 21 is moved to satisfy the following equation:

$$(A+D)-(B+C)+\delta=0$$

As a result, as shown by FIG. 4(a) ② the objective lens 21 is not in-focus on the disk 60, whereby a shape of the spot on the photo sensor 45 becomes an ellipse, as shown by FIG. 4(b)②. Namely, by adding the offset, the focusing error sensing circuit 50 determines that a point separate from the actual in-focus point is an in-focus point, and outputs a command signal to a drive circuit to hold the objective lens 21 at this apparent in-focus point. Accordingly, the focusing error sensing circuit 50 controls the objective lens 21 to maintain the ellipse at the same shape.

In a state shown by FIG. 4(a) ②, which the beam spot on the disk 60 is not fully converged on the disk surface, the magnetic recorded signal IVFO, the tracking error signal TE and the F-T cross-talk become small. In this state, a recording and reproduction of signals can not be carried out.

Then, while sensing the magnetic recorded signal IVFO by the photo sensors 42a and 42b, the condenser lens 43 is moved along the optical axis by the adjusting mechanism 49, so that the magnetic recorded signal IVFO is at a maximum value. This operation is carried out because, when the magnetic recorded signal IVFO is at a maximum value, the objective lens 21 is at an in-focus position. Due to this movement of the condenser lens 43, the shape of the spot on the photo sensor 45 is changed. As a result, the focusing error sensing circuit 50 controls the objective lens 21 to maintain the spot as an ellipse. Thus, the objective lens 21 is again controlled so that it is in-focus on the disk 60, as shown by FIG. 4(a)③. Accordingly, a state in which a recording reproduction of signals can be carried out is obtained. In this state, the spot on the photo sensor 45 is maintained as an ellipse, as shown by FIG. 4(b) ③and as described above, the F-T cross-talk is reduced, as shown by FIG. 4 (c) ③, in comparison with a state shown by ①. Note, the amount of F-T cross-talk may become large depending upon a polarity of the offset. In this case, an offset having the opposite polarity should be added.

In the steps shown by ④ and ⑤ of FIG. 4, the same operations as the steps ② and ③ are again carried out, and the F-T cross-talk is further reduced.

Figure 5:
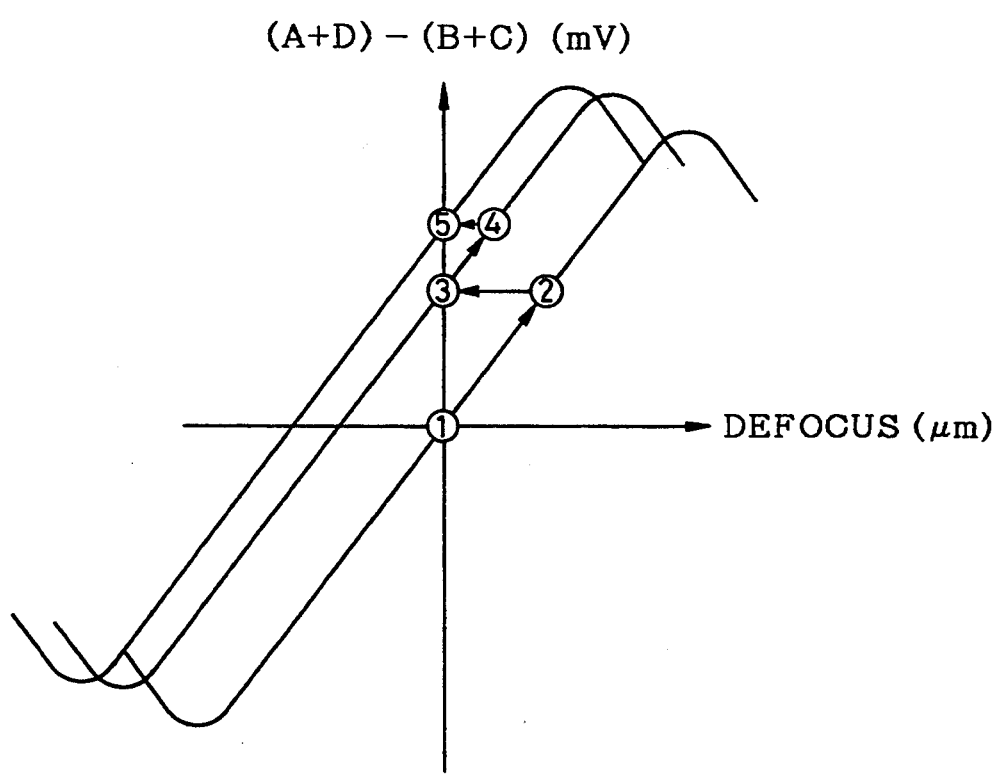
FIG. 5 is a graph showing a relationship between the focusing error signal and a position of an objective lens after adding an offset.

FIG. 5 is a graph showing a value obtained by calculating the signal outputted by the photo sensor 45 that is, (a value without the offset δ), and an actual defocus value. Note, steps ① through ⑤ correspond to the same steps as shown in FIG. 4, respectively.

As described above, in this embodiment, the offset is added to the focusing error signal, and while the spot on the photo sensor 45 is maintained as an ellipse by moving the condenser lens 43, an in-focus position of the objective lens 21 is determined. The change of the shape of the spot on the photo sensor 45 from a circle to an ellipse causes a rotational displacement of an area having an abnormal distribution of light, which occurs due to the wave aberration AS2 generated when the beam spot crosses over the track. The F-T cross-talk is reduced by the above described operation because the abnormal distribution component caused by the wave aberration AS2 is moved to the boundary portion of the beam receiving areas.

Note, although the F-T cross-talk is reduced by the addition of the offset and the movement of the condenser lens 43 in the above embodiment, a rotation of the photo sensor 45 or the cylindrical lens 44 about the optical axis also can reduce the cross-talk to some extend.

If the photo sensor 45 or the cylindrical lens 44 is rotated, the area of the abnormal distribution of the amount of light can be rotated onto the boundary of the beam receiving areas, while maintaining the shape of the spot on the photo sensor 45 as a circle. When the area of abnormal distribution is moved onto the boundary of the beam receiving areas, the abnormal areas are eliminated when calculating the focusing error signal. Therefore, the F-T cross talk is not generated. Note, when the effect of the waver aberration AS2 is removed by the rotation of the photo sensor 43 or the cylindrical lens 44, setting the rotational angle to a large value may interfere with a sensing of the other errors than the focusing and tracking errors.

Although the embodiments of the present invention have been described herein with reference to the accompanying drawings, obviously many modifications and changes may be made by those skilled in this art without departing from the scope of the invention.

The present disclosure relates to subject matter contained in Japanese patent application No. 2 HEI 2-208630 (filed on Aug. 7, 1990) which is expressly incorporated herein by reference in its entirety.

We claim:

1. A device for reducing cross-talk generated in an optical disk device, comprising:
    a light source that produces a beam spot that is directed towards an optical disk;
    means for imparting an astigmatism to a luminous flux reflected from said optical disk, and for converging said luminous flux;
    means for receiving said reflected luminous flux and outputting a focusing error signal that represents a focusing condition of said reflected luminous flux;
    an objective lens;
    means for controlling said objective lens in accordance with said focusing error signal so that said beam spot is converged on said optical disk;
    means for sensing said focusing condition in which said beam spot is converged on said optical disk;
    means for setting a predetermined offset that is applied to said focusing error signal when an abnormal distribution is included in an intensity of said luminous flux reflected from said optical disk; and
    means for adjusting said astigmatism imparting means in response to said sensed focusing condition when said predetermined offset is set to said focusing error signal, such that said objective lens is adjusted to converge said beam spot on said optical disk.

2. A device according to claim 1, wherein said receiving means includes a photo sensor, on which a spot of said reflected luminous flux is formed and a plurality of receiving areas are defined, a distribution of said spot of said luminous flux on said photo sensor being changed by said predetermined offset set to said focusing error signal.

3. A device according to claim 1, wherein said receiving means includes a photo sensor on which a spot of said reflected luminous flux is formed, said spot being formed in a shape of a circle when said focusing error signal is substantially zero, while being formed in a shape of an ellipse when said focusing error signal is substantially not zero, said objective lens being controlled so that said beam spot is converged on said optical disk while maintaining said ellipse shape thereof generated by adding said predetermined offset to said focusing error signal.

4. A device according to claim 1, wherein said setting means further sets an offset to said focusing error signal after said adjusting means has adjusted said imparting means, said adjusting means then re-adjusting said imparting means in accordance with said focusing condition.

5. A device according to claim 1, wherein said sensing means comprises a photo sensor that is provided for reproducing a signal recorded on said optical disk, said photo sensor being used for detecting whether said beam spot is converged on said optical disk when said adjusting means adjusts said imparting means.

6. A device according to claim 5, wherein said adjusting means adjusts said astigmatism imparting means so that an output of said photo sensor is brought to a maximum value.

7. A device according to claim 1, wherein said imparting means comprises a condenser lens, and said adjusting means moves said condenser lens along an optical axis of said condenser lens.

8. A device according to claim 1, wherein said astigmatism imparting means comprises a condenser lens and a cylindrical lens, and said adjusting means rotates at least one of said condenser lens and said cylindrical lens about an optical axis of at least one of said condenser lens and said cylindrical lens.

9. A device for reducing cross-talk generated in an optical disk device, comprising:
   a light source that produces a beam spot that is directed towards an optical disk;
   an optical system for imparting an astigmatism to a luminous flux reflected from said optical disk through an objective lens, and for converging said luminous flux;
   means for receiving said reflected luminous flux from said optical system;
   means for generating a focusing error signal in accordance with a shape of said beam spot of said reflected luminous flux on said receiving means;
   means for controlling said objective lens in accordance with said focusing error signal so as to maintain a predetermined shape of said beam spot;
   means for sensing an intensity of said reflected luminous flux from said optical disk;
   means for changing said predetermined shape by adding a predetermined offset to said focusing error signal when an abnormal distribution is included in said intensity of said luminous flux reflected from said optical disk, whereby said focusing error signal generating means outputs a focusing error signal that includes said predetermined offset; and
   an adjusting mechanism for adjusting a position of said optical system in response to an output of said intensity sensing means, whereby said controlling means moves said objective lens in such a manner that said predetermined shape of said beam spot changed by said changing means is maintained, wherein said optical system is separate from said objective lens.

10. A device according to claim 9, wherein said adjusting mechanism adjusts said position of said optical system in an optical axis direction.

11. A device for reducing cross-talk generated in an optical disk device, comprising:
   a light source that produces a beam spot that is directed towards an optical disk;
   an optical system for imparting an astigmatism to a luminous flux reflected from said optical disk, and for converging said luminous flux, said optical system including means for adjusting a position of said optical system;
   a focusing control system for receiving said reflected luminous flux and outputting a focusing error signal in accordance with an astigmatism method, said focusing control system controlling a focusing of said beam spot on said optical disk in accordance with said focusing error signal;
   means for sensing a focused condition of an objective lens with respect to said optical disk, said objective lens being separate from said optical system; and
   means for setting an offset level that is applied to said focusing error signal to effect a change in a shape of said beam spot, wherein
   said optical system is adjusted by said adjusting mean sin response to an output of said sensing means so that said beam spot is converged on said optical disk.

12. A device for reducing cross-talk generated in an optical disk device, comprising:
   a light source that produces a beam spot that is directed towards an optical disk;
   an astigmatism generating element for imparting an astigmatism to a luminous flux reflected from said optical disk;
   a photo sensor for receiving said reflected luminous flux and outputting a focusing error signal in accordance with said reflected luminous flux;
   an objective lens; and
   a control mechanism for controlling said objective lens in response to said focusing error signal so that said beam spot is converged on said optical disk based upon said focusing error signal, wherein
   said astigmatism generating element and said photo sensor are rotatable about an optical axis relative to each other.

13. A device for an optical disk having means for generating a focusing error signal obtained by an astigmatism method, comprising:
   means for setting a predetermined offset that is applied to said focusing error signal;
   means for sensing an intensity of a luminous flux produced by a light source associated with said optical disk device, said luminous flux being reflected from said optical disk;
   an optical system for imparting an astigmatism to said luminous flux; and
   an adjusting mechanism for adjusting a position of said optical system at which said luminous flux is converged on said optical disk by an objective lens associated with said optical disk device, said adjusting mechanism adjusting said luminous flux position in accordance with an output of said intensity sensing means so that a divergence of said converging position caused by setting said predetermined offset is cancelled, said adjusting mechanism comprising means for adjusting a position of said optical system which is separate from said objective lens said predetermined offset being applied to said focusing error signal when an abnormal distribution is included in said intensity of said luminous flux reflected from said optical disk.

14. A method of reducing cross-talk generated in an optical disk device, said method comprising:
   producing a beam spot that is directed towards an optical disk;
   imparting as astigmatism to a luminous flux reflected from the optical disk by an optical system;
   receiving the reflected luminous flux passed through the optical system and outputting a focusing error signal in accordance with a condition of the reflected luminous flux;
   controlling an objective lens in response to the focusing error signal so that the beam spot is converged on the optical disk;
   setting a predetermined offset that is applied to the focusing error signal when an abnormal distribution is included in the intensity of said luminous flux reflected from said optical disk; and
   adjusting a position of the optical system, which is separate from the objective lens, in response to a detected intensity of said luminous flux reflected form said optical disk.

15. A method according to claim 14, wherein the steps of setting a predetermined offset and adjusting the objective lens are carried out a plurality of times.

16. A method according to claim 14, wherein the step of adjusting the objective lens comprises providing a photo sensor for reproducing a signal recorded on the optical disk, the photo sensor outputting a signal having a maximum value.

17. A method according to claim 14, further comprising the step of moving the beam spot from an inside portion of the optical disk to an outside portion of the optical disk during a rotation of the optical disk, the step of moving the beam spot being carried out while the beam spot is converged on a track that is formed in a spiral shape on the optical disk, and is jumped from one track to an adjacent inside track at every one revolution of the optical disk.

* * * * *

UNITED STATES PATENT AND TRADEMARK OFFICE
CERTIFICATE OF CORRECTION

PATENT NO.　：　5,373,437
DATED　　　：　December 13, 1994
INVENTOR(S) ：　Tsuyoshi ITOH et al.

It is certified that error appears in the above-indentified patent and that said Letters Patent is hereby corrected as shown below:

At column 11, lines 63 and 64 (claim 11, lines 22 and 23), change "mean sin" to ---means in---.
　　　At column 12, line 47 (claim 14, line 5), change "as" to ---an---.

Signed and Sealed this

Eighteenth Day of July, 1995

*Attest:*

BRUCE LEHMAN

*Attesting Officer*　　　*Commissioner of Patents and Trademarks*